United States Patent [19]
Pemberton et al.

[11] Patent Number: 5,839,392
[45] Date of Patent: Nov. 24, 1998

[54] PET CARRIER

[76] Inventors: Bonnie M. Pemberton, 2924 6th Ave., Fort Worth, Tex. 76110; Frank A. Wolfe, 2921 County Road 919, Burleston, Tex. 76028

[21] Appl. No.: 815,222

[22] Filed: Mar. 12, 1997

[51] Int. Cl.⁶ ..................................................... A01K 29/00
[52] U.S. Cl. ......................................................... 119/498
[58] Field of Search ..................................... 119/496, 497, 119/498, 499, 500, 474, 482, 489, 491, 493, 168, 511, 512, 513; 229/117.05, 117.15

[56] References Cited

U.S. PATENT DOCUMENTS

| | | | |
|---|---|---|---|
| 3,039,670 | 6/1962 | Hardon | 229/117.05 |
| 3,522,904 | 8/1970 | Locke et al. | 119/497 |
| 4,010,888 | 3/1977 | Gilbert | 119/497 X |
| 5,074,460 | 12/1991 | Hanekamp | 229/117.05 |
| 5,572,951 | 11/1996 | Evans et al. | 119/168 |

OTHER PUBLICATIONS

R.C. Steele Catalog Flyer Spring 1996.

*Primary Examiner*—Thomas Price
*Attorney, Agent, or Firm*—James E. Bradley

[57] ABSTRACT

A corrugated plastic pet carrier has a base panel with two side panels. A side panel fold line extends between the base panel and each side panel. The side panels terminate with side panel top flaps which have a handle. Top fold lines extend between the side panels and top flaps. When the pet carrier is assembled, the top flaps abut one another. The top flaps have holes for venting fresh air to the pet inside the pet carrier. The base panel also has two end panels with fold lines separating the base panel from the end panels. The end panels terminate with end panel top flaps. When the pet carrier is collapsed, fasteners secured to the lower corners of the side panels are joined to maintain the pet carrier in a collapsed position. Extending from each side of each end panel is a side support flap. The side support flaps are folded inward toward each other. The side support flaps are secured to the interior surfaces of the side panels. In the operating configuration, the end panel top flaps are folded over the side panel top flaps to form a breathable enclosure for carrying a pet while preventing the pet from forcing pet carrier open and escaping. The pet carrier also has a loading configuration for loading a pet and may be collapsed for convenient storage and handling.

11 Claims, 3 Drawing Sheets

PET CARRIER

TECHNICAL FIELD

This invention relates in general to pet transportation devices and in particular to a collapsible pet carrier.

BACKGROUND ART

Pet owners occasionally have need to transport their pets. Rather than simply carrying a pet in one's arms, owners prefer to use an appropriately sized pet carrier having a handle. Portable pet carriers are typically made from blow-molded plastic or wire. When not in use, these pet carriers can be bulky and difficult to store.

DISCLOSURE OF INVENTION

A corrugated plastic pet carrier has a rectangular base panel with two opposing side panels extending upward from each of the long edges of the base panel. A side panel fold line extends between the base panel and each side panel. The side panels terminate on the end opposite the base panel with side panel top flaps which have a handle. Top fold lines extend between the side panels and top flaps. When the pet carrier is assembled, the top flaps abut one another. The side panel top flaps include a plurality of small apertures for venting fresh air to the pet inside the pet carrier. Two handle notches are cut into the end edges of each of the side panel top flaps. The handle notches align with each other when the side panel top flaps are brought together in a parallel fashion.

The base panel also has two opposing end panels extending upward from each of the transverse edges of the base panel. Fold lines separate the base panel from the end panels. The end panels terminate on the end opposite the base panel with end panel top flaps. The end panel top flaps each have a handle slot aligned to receive the handle notches when the side panel top flaps are brought together. A strip is secured to each lower corner of one side panel. The strips have a snap fasteners which mate with fasteners on the other side panel. When the pet carrier is collapsed, the strips and fasteners are joined to maintain the pet carrier in a collapsed position.

Extending from each side of each end panel is a side support flap. The side support flaps are folded toward the interior of the end panels flush toward the interior surfaces of the side panels. The side support flaps are fastened to the interior surfaces of the side panels.

In the operating configuration, the end panel top flaps are folded over to form a breathable enclosure for carrying a pet while preventing the pet from forcing pet carrier open and escaping. The pet carrier also has a loading configuration for loading a pet. Finally, the pet carrier may be collapsed for convenient storage and handling. The end panels fold in half vertically and inwardly while the base panel folds inwardly along longitudinal and diagonal fold lines until the fasteners can be secured to one another, thereby holding the pet carrier in the storage configuration.

BEST MODE FOR CARRYING OUT THE INVENTION

Figure 1:
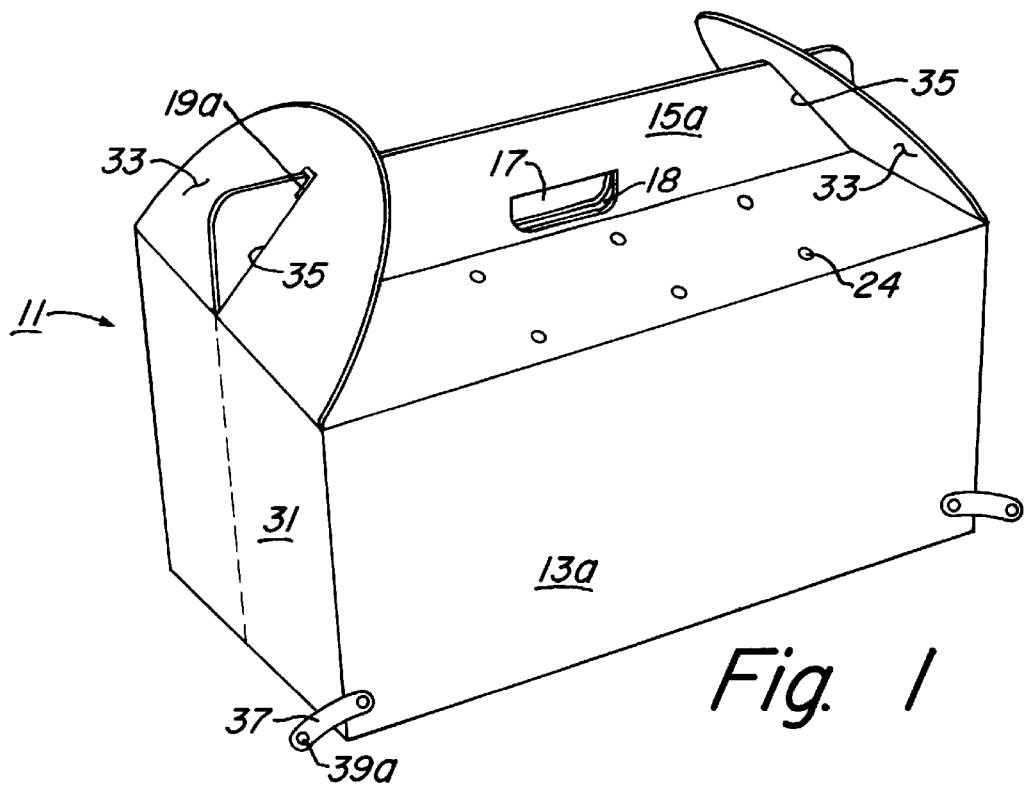
FIG. 1 is a perspective view of the pet carrier of the present invention in the operating configuration.
Figure 2:
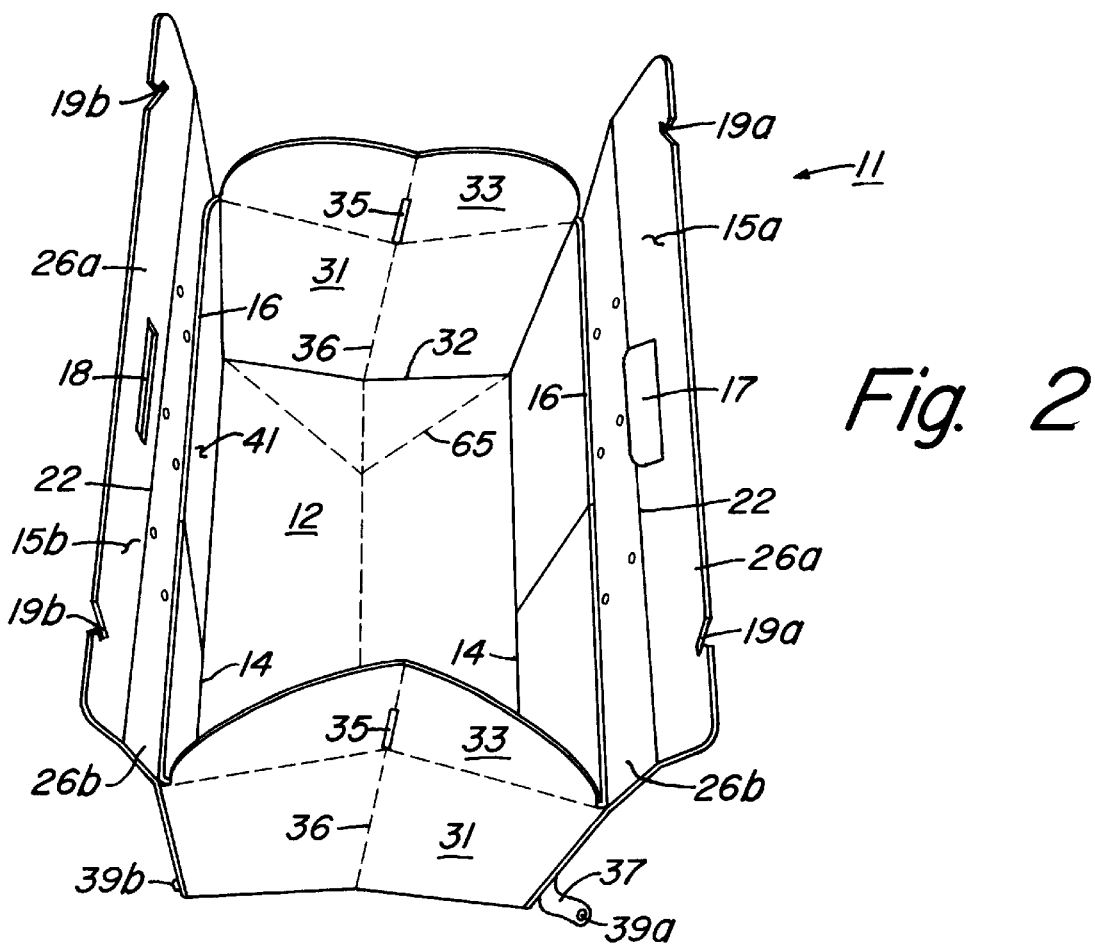
FIG. 2 is a perspective view of the pet carrier of FIG. 1 in the loading configuration.

Referring to FIGS. 1 and 2, a pet carrier 11 is shown. Pet carrier 11 is preferably die cut of corrugated plastic but can be made of any lightweight durable material. Pet carrier 11 has a rectangular base panel 12 with two opposing side panels 13a and 13b extending up from each of the long edges of the rectangular base panel 12. A side panel fold line 14 extends between base panel 12 and each side panel. Side panels 13a and 13b terminate on the end opposite the rectangular base panel 12 with side panel top flaps 15a and 15b, respectively. Top fold lines 16 extend between sides panels 13a, 13b and top flaps 15a, 15b, respectively. Side panel top flap 15a includes a handle flap 17 which is aligned with and received by a handle flap aperture 18 located on side panel top flap 15b. Handle flap 17 folds through handle aperture 18 when side panel top flaps 15a and 15b are brought together in a parallel fashion to form a handle by which the pet carrier 11 may be carried. Handle fold lines 22 longitudinally bisect top flaps 15a, 15b into upper top flaps 26a, 26b and lower top flaps 28a, 28b, respectively. When pet carrier 11 is assembled, upper top flaps 26a, 26b abut one another. Side panel top flaps 15a and 15b include a plurality of small apertures 24 for venting fresh air to the pet inside the pet carrier 11.

Two handle notches 19a and 19b are cut into the end edges of each of the side panel top flaps 15a and 15b, respectively. Handle notches 19a are cut into the end edges of side panel top flap 15a and align with handle notches 19b which are cut into the end edges of side panel top flap 15b when side panel top flaps 15a and 15b are brought together in a parallel fashion.

Rectangular base panel 12 has two opposing end panels 31 extending up from each of the transverse edges of the rectangular base panel 12. Fold lines 32 separate base panel 12 from end panels 31. End panels 31 terminate on the end opposite the rectangular base panel 12 with end panel top flaps 33. End panel top flaps 33 are preferably semi-circular in shape. End panel top flaps 33 each have a handle slot 35 aligned so as to receive handle notches 19a and 19b when side panel top flaps 15a and 15b are brought together in a parallel fashion. A strip 37 is secured to each corner of side panel 13a near base panel 12. Strip 37 has a snap fastener 39a which mates with fasteners 39b located on side panel 13b. When pet carrier 11 is collapsed, strips 37 and fasteners 39a are affixed to fasteners 39b to maintain carrier 11 in a collapsed position.

Extending from each side of each end panel 31 are side support flaps 41. Side support flaps 41 extend from the end panels 31 a distance preferably equal to one half the length of the rectangular base panel 12. Side support flaps 41 are preferably folded towards the interior of end panels 31 and located perpendicular to end panels 31 and flush to the interior surfaces of side panels 13a and 13b. Side support flaps 41 are permanently fastened to the interior surfaces of side panels 13a and 13b, preferably by an adhesive such as glue or epoxy, depending on the material from which the pet carrier 11 is constructed.

Pet carrier 11 as shown in FIG. 1 in the operating configuration for carrying a pet. End panel top flaps 33 are folded over side panel top flaps 15a and 15b so as to align with handle notches 19a and 19b to form a breathable enclosure for carrying a pet while preventing the pet from forcing pet carrier 11 open and escaping. As shown in FIG. 2, pet carrier 11 has a loading configuration for loading a pet into the pet carrier 11.

Figure 3:
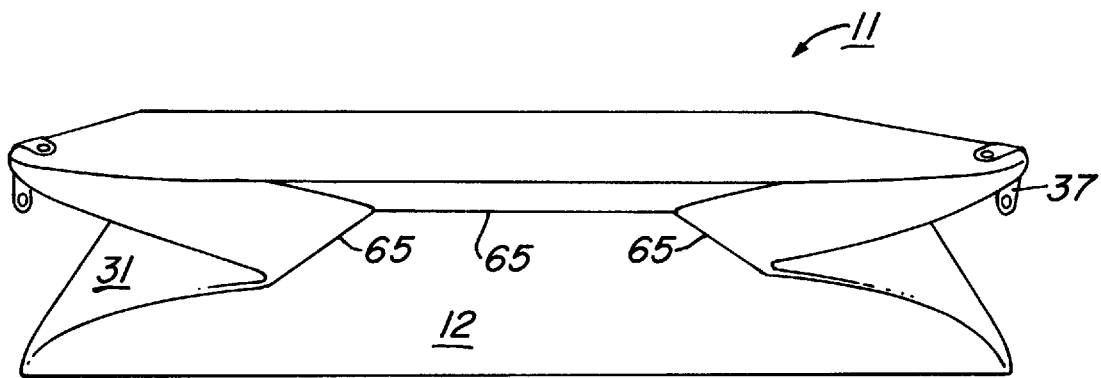
FIG. 3 is a perspective view of the bottom of the pet carrier of FIG. 1 in the storage configuration.
Figure 4:
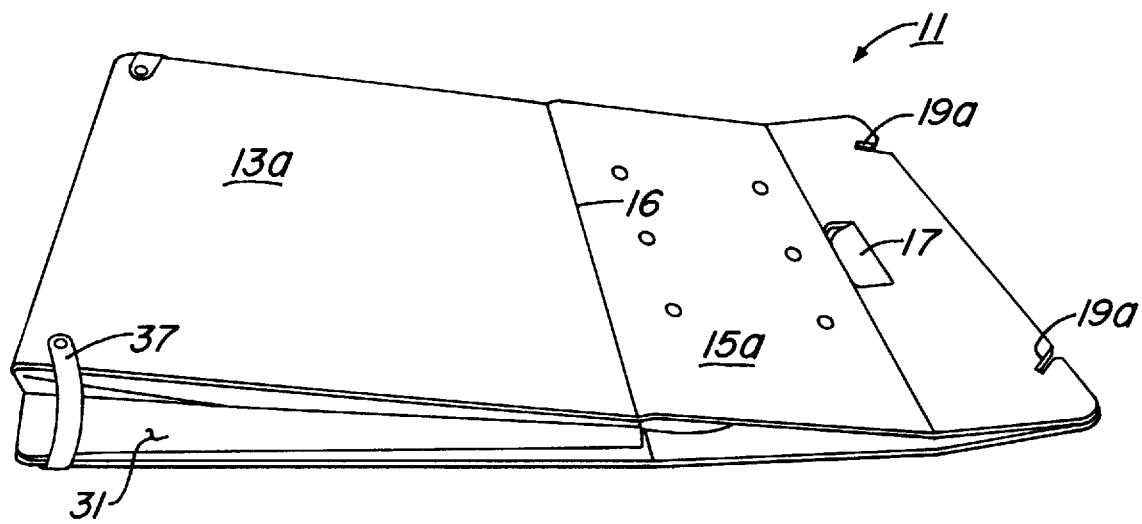
FIG. 4 is a perspective view of the side of the pet carrier of FIG. 1 in the storage configuration.
Figure 5:
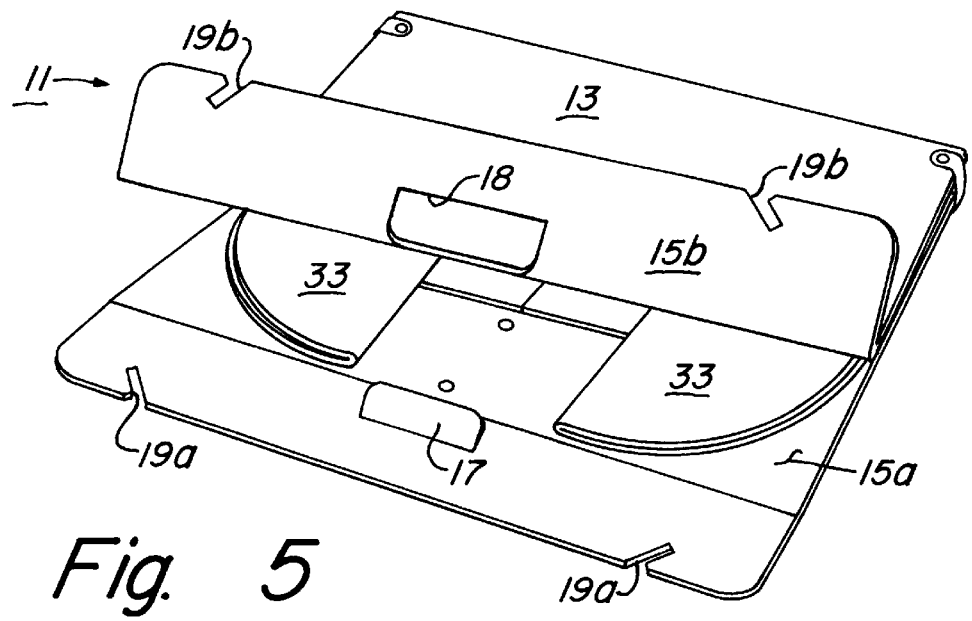
FIG. 5 is a perspective view of the top of the pet carrier of FIG. 1 in the storage configuration.
Figure 6:
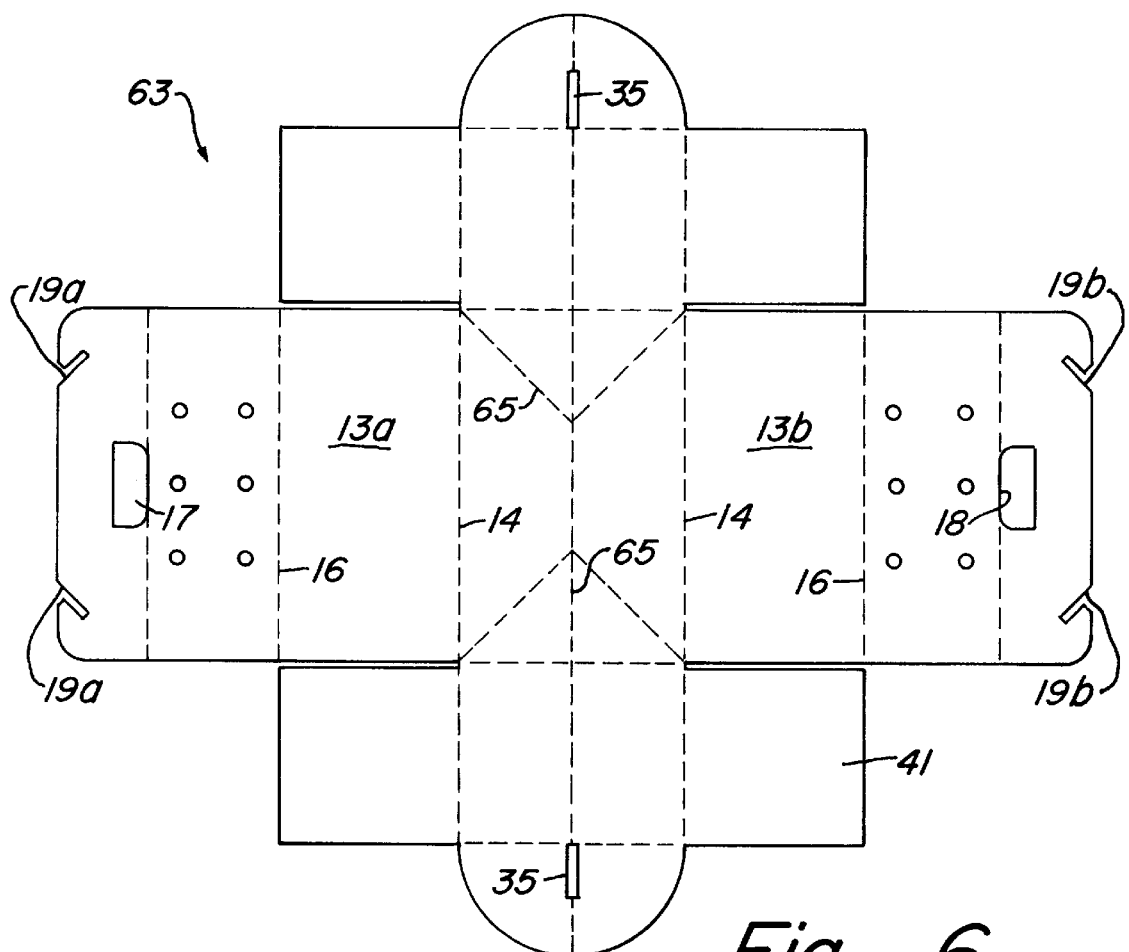
FIG. 6 is a plan view of the die cut layout used to form the pet carrier of FIG. 1.

Referring now to FIGS. 3–5, the pet carrier 11 may be collapsed upon itself for convenient storage and handling. End panels 31 fold in half vertically and inwardly and rectangular base 12 folds inwardly along longitudinal and diagonal fold lines 65 until strips 37 and fasteners 39a meet with and temporarily bond with fasteners 39b, thereby holding the pet carrier 11 in the storage configuration. End panel top flaps 33 fold in half vertically and inwardly along midlines 36 when the pet carrier 11 is in the storage configuration. As shown in FIG. 6, pet carrier 11 is formed by folding a single sheet of die cut corrugated plastic 63.

The invention has several advantages. The pet carrier may be conveniently collapsed into a relatively flat configuration for storage while providing all the features of conventional pet carriers. The pet carrier is also lightweight and durable.

While the invention has been shown in only one of its forms, it should be apparent to those skilled in the art that it is not so limited, but is susceptible to various changes without departing from the scope of the invention.

I claim:

1. A container formed from a flat, durable, flexible blank for holding a pet, comprising:

a unitary base panel defined by a pair of end fold lines and a pair of side fold lines;

a pair of opposed side panels extending upward from the base panel at the side fold lines and having a side flap fold line at an upper end;

a pair of opposed end panels extending upward from the base panel at the end fold lines;

a top joined to at least one of said side panels and said end panels;

a handle located above the top for carrying the container with one hand;

vent holes in at least one panel;

a first median fold line in the base panel centered between the side panels and extending from one of the end panels to the other of the end panels for collapsing the base panel into two halves;

a second median fold line in each end panel centered between the side panels and joining the first median fold line for collapsing the end panels into two halves; and a diagonal fold line extending from each corner of the base panel to the first median fold line for collapsing the base panel, side panels and end panels inward for collapsing the container from an erect position to a collapsed, generally flat position, and back to an erect position.

2. The container of claim 1 wherein the blank comprises corrugated plastic.

3. The container of claim 1 wherein the vent holes are in the top.

4. A container formed from a flat, durable, flexible blank for holding a pet, comprising:

a unitary base panel defined by a pair of end fold lines and a pair of side fold lines;

a pair of opposed side panels extending upward from the base panel at the side fold lines and having a side flap fold line at an upper end;

a side panel top flap inclining upward and inward from each side flap fold line, each side panel top flap having an upper portion, a lower portion and a handle fold line therebetween, each upper portion extending vertically upward from the handle fold line, the upper portions abutting one another and each having an opening protruding therethrough which register to define a handle;

a pair of opposed end panels extending upward from the base panel at the end fold lines and having an end flap fold line at an upper end;

an end panel top flap inclining upward and inward from each end flap fold line;

engagement means for engaging the end panel top flaps with the upper portions to give the container greater rigidity;

a plurality of vent holes formed in the container;

a first median fold line in the base panel centered between the side panels for collapsing the base panel into two halves;

a second median fold line in each end panel centered between the side panels for collapsing the end panels into two halves; and a diagonal fold line extending from each corner of the base panel to the first median fold line for collapsing the base panel, side panels and end panels inward for collapsing the container from an erect position to a collapsed, generally flat position, and back to an erect position.

5. The container of claim 4 wherein the engagement means comprises interlocking slots and notches located on the end panel top flaps and the upper portions, respectively.

6. The container of claim 4 wherein the blank comprises corrugated plastic.

7. The container of claim 4 wherein the vent holes are in the side panel top flaps.

8. The container of claim 4 wherein the lower portion of the side panel top flap is inclined relative to the base panel; and wherein the upper portion of the side panel top flap is perpendicular to the base panel.

9. A container formed from a flat, durable, flexible blank for holding a pet, comprising:

a unitary base panel defined by a pair of end fold lines and a pair of side fold lines;

a pair of opposed side panels extending upward from the base panel at the side fold lines;

a pair of opposed end panels extending upward from the base panel at the end fold lines;

a side panel top flap inclining upward and inward from a side fold line at an upper edge of each side panel, each side panel top flap having an upper portion, a lower portion and a handle fold line therebetween, each upper portion extending upward from the lower portion perpendicular to the base panel and having a pair of slotted notches adjacent to each end of the side panel top flaps, the upper portions abutting one another;

an end panel top flap inclining upward and inward from an end flap fold line at an upper edge of each end panel, each end panel having a vertically oriented slot for engaging one of the slotted notches on the upper portion;

a plurality of vent holes in the container;

a median fold line in the base panel centered between the side panels for collapsing the base panel into two halves;

a median fold line in each end panel centered between the side panels for collapsing the end panels into two halves; and a diagonal fold line extending from each corner of the base panel to the median fold line in the base panel for collapsing the base panel, side panels and end panels inward to a generally flat configuration.

10. The container of claim 9 wherein the end panel top flap has a curved perimeter.

11. The container of claim 9 wherein the lower portion of the side panel top flap is inclined relative to the base panel.

* * * * *